Jan. 2, 1923.
F. J. SEABOLT.
ELECTRIC WINDING DEVICE FOR PHONOGRAPHS.
ORIGINAL FILED MAY 5, 1915.
1,440,634
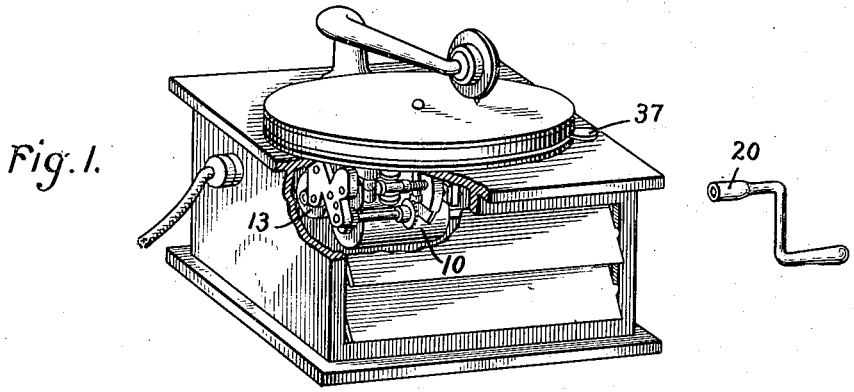
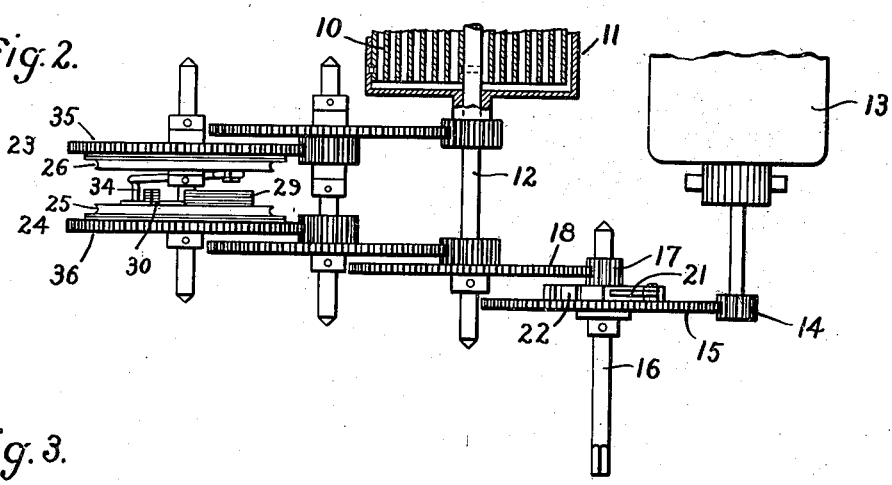
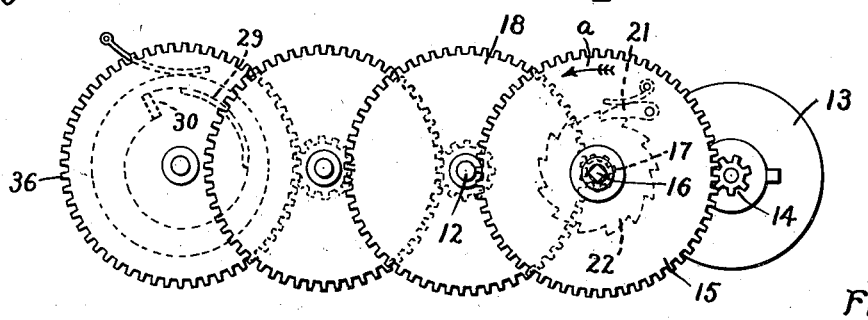
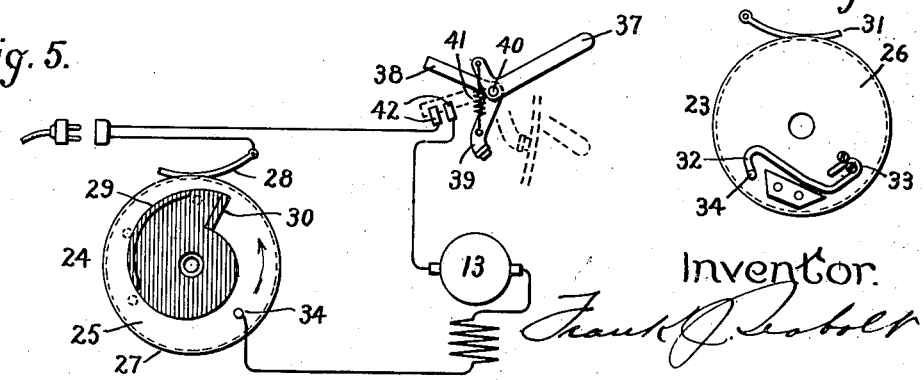
Inventor.
Frank J. Seabolt Patented Jan. 2, 1923.

1,440,634

UNITED STATES PATENT OFFICE.

FRANK J. SEABOLT, OF SCHENECTADY, NEW YORK, ASSIGNOR OF ONE-EIGHTH TO EDWARD F. PICKFORD, OF WASHINGTON, DISTRICT OF COLUMBIA, ONE SIXTY-FOURTH TO CHARLES D. KNIGHT, OF SCHENECTADY, NEW YORK, AND ONE-EIGHTH TO MABLE H. HALL, NOW BY MARRIAGE MABLE H. THOMSON, BOTH OF SCHENECTADY, NEW YORK.

ELECTRIC WINDING DEVICE FOR PHONOGRAPHS.

Application filed May 5, 1915, Serial No. 26,059. Renewed February 5, 1919. Serial No. 275,251.

*To all whom it may concern:*

Be it known that I, FRANK J. SEABOLT, a citizen of the United States, residing at Schenectady, county of Schenectady, State of New York, have invented certain new and useful Improvements in Electric Winding Devices for Phonographs, of which the following is a specification.

My invention relates to improvements in sound reproducing machines such as phonographs and the like and has for its object the provision of means whereby the machine is rendered automatic to the extent that manual winding becomes unnecessary, in a simple and reliable manner.

It has been found desirable to do away as much as possible with manual operation in connection with phonographs and the like. In order to avoid the manual winding of the machine, it has been proposed to eliminate the spring motor as an operating element and substitute therefor, an electric motor. In adopting this idea in practice, several disadvantages have been found to exist. First, it has been found difficult to get an electric motor which will operate quietly enough so as not to interfere with the sounds coming from the machine. Second, it has been found difficult to avoid variations in speed due to variations in voltage and other conditions. Third, it has been found to be a great disadvantage not to be able to operate the machine in places and under conditions where the supply of electric current is not available. One of the objects of my invention is to avoid the above noted difficulties and disadvantages.

In carrying out my invention, I utilize the spring motor for operating the machine and provide an electric motor for winding the spring. My arrangement is such that the winding of the spring is caused to occur automatically as soon as the machine is stopped and the winding is stopped as soon as the machine is started. In one form of my invention, the starting and stopping of the electric winding motor is controlled by the starting member so that when the starting member is moved to stop the machine, the electric motor is started and when it is moved to start the machine the motor is stopped if it should be running. The electric motor is also controlled by the spring so that when the spring is wound up a predetermined amount, the winding will be automatically stopped independently of the starting member. By this arrangement, the machine is made automatic, while retaining all of the advantages of the spring motor drive.

In the accompanying drawing, illustrating one form of my invention, Fig. 1 is a perspective view of a phonograph embodying my improvements. Fig. 2 is a view showing the driving connections between the electric motor, the spring motor and the contact members. Fig. 3 is a side elevation of the same. Fig. 4 is a detail of one of the contact elements and Fig. 5 is a diagram of the circuit connections.

Referring to Figs. 2 and 3, 10 represents the spring driving motor of the phonograph. I have not shown the driving connections between this spring motor and the revolving table of the machine, since the machine itself including the spring motor may be of any standard and well-known design. I have simply shown the spring in the drum 11, the inner end of the spring being connected to the winding shaft 12 while the outer end is connected to the drum. 13 represents an electric motor which is utilized for winding the spring by turning the shaft 12. I have shown the motor geared to the shaft 12 in two reductions, one reduction being through pinion 14 fixed to the motor shaft and gear 15 loose on an intermediate shaft 16 while the second reduction is by means of a pinion 17 fixed to the shaft 16 and gear 18 fixed to the shaft 12. I have shown the shaft 16 as being arranged for manual winding, the outer end being squared to enter the socket of crank 20. The shaft 16 and pinion 17 are driven from the gear 15 by a pawl 21 pivoted to the gear so as to engage a ratchet 22 secured to the shaft 16. When the electric motor 13 operates, it will turn the gear 15 in the direction of arrow *a* and wind the spring whereas if the electric motor is stationary and the shaft 16 is turned by means of the crank 20, the spring will also be wound through pinion 17, the ratchet 22 slipping under the pawl 21 without affecting the gear 15 or the electric motor. For controlling the circuit of the electric motor, I provide two contact members 23, and 24, the former being driven by the drum as the spring runs down, while the latter is driven by the motor from the shaft 12 as the spring is wound up.

Referring to Figures 4 and 5, 25 represents the contact element of the member 24 and 26 represents the contact element of member 23. The contact element 25 consists of a disc 27 of conducting material grooved at its periphery to receive the brush 28. The inner portion of this disc is of insulating material, a portion of the periphery of which consists of an eccentric rib 29 which extends above the metallic surface while the remainder of the insulating material is flush with the conducting material. A projection 30 is located as shown so as to form a stop. The element 26 simply consists of a metallic disc likewise grooved to receive a brush 31 and a spring contact 32 having one end secured to the disc at 33 while the free end 34 is bent at right angles to the plane of the disc. The two contact elements are mounted on and insulated from gears 35 and 36 respectively and are arranged opposite each other as shown in Fig. 2. The end 34 of the spring 32 projects over into engagement with the flat surface of disc 27 and is deflected by the rib 29 so as to place the spring under tension. It will be noted that the spring 32 yields in two planes, that is in the plane of the disc on which it is mounted and also at right angles to this plane. This enables the spring to be yieldingly pressed against the conducting and insulating surfaces of the element 25 and also to snap from the conducting to the insulating surfaces and vice versa. I have shown these contact members mounted upon gears which rotate very much slower than the drum and winding shaft respectively. Two reductions are shown for purposes of illustration so that the drum will make several revolutions while the contact members revolve only a short distance. The total gear reduction between the spring drum and the element 23 in the arrangement shown is such that while the drum is making a sufficient number of revolutions to play the shortest of the standard records, the element 23 will rotate a portion of a revolution corresponding to the length of the rib 29; that is, approximately one-third of a revolution. This is on the assumption that the spring is to be wound after playing a single record which of course is not always necessary, or perhaps desirable. The reduction between the shaft 12 and the member 24 is the same as between the drum and the element 23, because the relative movement of the contacts in the particular arrangement shown should be the same as the relative movement of the spring drum and winding shaft so that the winding will always be stopped when a pre-determined wound-up condition is reached. It is understood that the specific driving connections of the contact members form no essential part of my invention and may be modified to suit particular requirements.

At 37 is shown the usual starting and stopping lever of the machine. I have shown this lever or controlling member of the type which applies a brake to the rotating table, although of course my invention may be employed in connection with any form of starting and stopping lever. This lever 37 is provided with switch arm 38 in addition to the brake arm 39. For purposes of illustration, I have shown the brake arm 39 and the switch arm 38 formed in one piece pivoted at 40 which is also the pivotal point of the lever 37. Spring 41 connects the lever 37 and the brake arm 39. When the lever 37 is turned to one position, as for instance the position shown in full lines, the spring will throw the switch arm 38 away from its contacts 42, also pull the brake arm out of braking relation. When moved to the position shown in dotted lines, the spring 41 will be moved across the pivotal center 40 and the brake will acordingly be applied and the contacts 42 bridged by the switch arm 38 as shown in dotted lines.

As thus constructed and arranged, the operation of my device will be as follows: Assume that the spring motor is partly run down, say for instance about two-thirds. Under this condition, the contact 34 will occupy about the position shown in Fig. 5 so that contact is made between the two contact elements 25 and 26 but the motor circuit is still open at contacts 42. If now, the lever 37 is operated to the position shown in dotted lines in Fig. 5 to stop the machine, the motor circuit will be completed at contacts 42. The motor circuit will be clear from Fig. 5. The motor will now operate to wind the spring and as it does so, contact element 25 will be rotated in a counter-clockwise direction (looking at Fig. 5) the contact element 26 remaining substantially stationary. When the rib 29 engages the end 34 of spring contact 32, the latter will be deflected and put under tension as it travels along the rib. When the end of the rib is reached, the contact spring snaps over onto the insulating material as shown and stops the motor. This represents the wound-up condition of the spring. When the machine is started by throwing the lever 37 to the position shown in the full lines of Fig. 5, the spring contact 34 is rotated by the drum (also in a counter-clock-wise direction, looking at Fig. 5) and travels along the inside surface of the rib and is again placed under tension. When the end of the rib is reached, the spring snaps over on to the conducting material, to the position shown in dotted lines.

It is intended that the spring contact shall travel the length of the rib from the position in which contact is broken to the position in which contact is made while one record is being played. That is by the time a record is completed the contact should preferably be made so that the winding will start but, of course, the contact can be made at any time before the record is completed depending upon the length of the rib. It is also intended that the spring shall be wound up the amount it has run down during the playing of one record in the time ordinarily required to change records. Therefore, when a record has been played contact will be made between the contact elements 25 and 26, the spring 34 being on the conducting surface near the end of the rib as shown. The lever 37 now being thrown to stop the machine, the motor circuit will be completed and the winding done while the record is being changed. This is intended to be the ordinary operation if the record is changed each time or at least sufficient time is allowed to elapse to complete the winding operation. If however, the record should be changed more quickly or perhaps not changed at all but played over without stopping the machine, the spring contact will continue in contact with the conducting surface. Perhaps at the end of the second period it shall have reached the position shown in full lines. At any rate, whenever the motor is stopped the winding will begin and if allowed time enough, will completely wind the spring. If the machine is started while the winding is in progress, it will make no difference whatsoever. The motor will simply be stopped until the machine is stopped. As indicated in the drawings, the parts are arranged for the playing of three records without a winding, but I have selected this number merely for purposes of illustration since the arrangement may obviously be whatever is found to be required in practice. The point is that when the machine is stopped long enough, the spring will be completely wound. Perhaps for a time the records might be changed so rapidly as not to allow a complete winding during the change of records. In this case, the spring will have a little less tension at the end of each successive record, but this quick change of records might be kept up for a very long time before the spring will be completely run down. In fact, it is not my intention to ever allow the spring to completely run down. To accomplish this end, I provide a stop 30 which projects outward like rib 29 so as to engage the spring contact when the spring reaches a point to correspond with the run down condition and stop the rotation of the spring drum. In this position the contact elements 25 and 26 will be in engagement so that when the lever 37 is thrown to stopping position, the motor circuit will be closed and the spring will be wound and if given sufficient time will be completely wound up. If the power should fail for any reason or there should be no power available the machine can be wound in the usual way with the crank.

It will be seen that with my invention all of the advantages of the direct electric motor drive are present without any of its disadvantages. If no current supply is available, the machine may be used as an ordinary manually wound machine. The motor is never in operation while the machine is running and the operation of the machine is in no way affected by variations of voltage.

While I have described my invention as embodied in concrete form and as operating in a specific manner in accordance with the provisions of the patent statutes, it should be understod that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. In combination, a phonograph or the like, having a spring motor for operating it, an electric motor for winding the spring, a controlling member to stop and release the phonograph, means whereby movement of said member to stop the phonograph closes the circuit of the electric motor when the spring motor has unwound a predetermined amount and movement to release the phonograph opens said circuit, and means whereby the motor circuit is opened independently of the controlling member when the spring is wound up a predetermined amount.

2. In combination, a phonograph or the like having a spring motor for operating it, an electric motor for winding the spring, a switch in the motor circuit provided with means whereby it is closed when the spring runs down a predetermined amount and remains closed during the further operation of the spring motor, a brake for the phonograph, a manual device for closing the motor circuit through the spring controlled switch and simultaneously applying the brake, and means for opening the motor circuit when the spring is wound up a predetermined amount.

3. In combination, a phonograph or the like having a spring motor for operating it, an electric motor for winding the spring, a switch in the motor circuit provided with means whereby it is automatcially closed when the spring partially runs down and opened when the spring is wound, a controlling member for the phonograph, and a switch operated by the controlling member to close the motor circuit through the spring controlled switch.

4. In combination, a phonograph or the like having a spring motor for operating it, an electric motor for winding the spring, a controlling member to stop and release the same, a switch in the motor circuit provided with means whereby it is automatically closed when the spring runs down a predetermined amount, remains closed during further operation of the spring motor, and automatically opens when the spring is wound up, and a manual switch operated simultaneously with the operation of the controlling member for closing the motor circuit through the spring controlled switch.

5. In combination, a phonograph or the like having a spring motor for operating it, means for stopping the spring motor at any time at the will of the operator, an electric motor for winding the spring, means whereby the electric motor is started to wind the spring whenever the spring motor after a predetermined movement is stopped and means for automatically stopping the electric motor when the spring is wound up.

6. In combination, a phonograph or the like, having a spring motor for operating it, means for stopping and starting the spring motor at any time at the will of the operator, an electric motor for winding the spring, a switch in the motor circuit which is automatically opened when the spring is wound up and closed after it starts to run down, and means whereby the electric motor is started whenever the spring motor after closing the switch is stopped.

7. In combination, a phonograph or the like having a spring motor for operating it, means for stopping and starting the spring motor at any time at the will of the operator, an electric motor for winding the spring, a switch in the motor circuit which is automatically opened when the spring is wound up and closed after it starts to run down, and means whereby the electric motor is stopped whenever the spring motor is started and is started whenever the spring motor after closing the switch is stopped.

8. In combination, a phonograph or the like having a spring motor for operating it, an electric motor for winding the spring, a controlling member for stopping and releasing the phonograph at the will of the operator and means including a switch and operated by the controlling member for controlling the electric motor.

In witness whereof, I have hereunto set my hand this third day of May, 1915.

FRANK J. SEABOLT.